United States Patent
Morris et al.

(10) Patent No.: US 7,817,883 B2
(45) Date of Patent: Oct. 19, 2010

(54) OPTICAL ASSEMBLY AND METHOD OF MAKING SAME

(75) Inventors: James Morris, Lake Wylie, SC (US); Hongtao Han, Mooresville, NC (US); Adam Fedor, Superior, CO (US); Robert Te Kolste, Charlotte, NC (US); Jay Mathews, Huntersville, NC (US); Michael Feldman, Huntersville, NC (US)

(73) Assignee: Tessera North America, Inc., Charlotte, NC (US)

( * ) Notice: Subject to any disclaimer, the term of this patent is extended or adjusted under 35 U.S.C. 154(b) by 0 days.

(21) Appl. No.: 12/292,313

(22) Filed: Nov. 17, 2008

(65) Prior Publication Data

US 2009/0103866 A1    Apr. 23, 2009

Related U.S. Application Data

(63) Continuation of application No. 11/295,720, filed on Dec. 7, 2005, now Pat. No. 7,466,502.

(60) Provisional application No. 60/701,505, filed on Jul. 22, 2005.

(51) Int. Cl.
    *G02B 6/28*    (2006.01)
(52) U.S. Cl. .............................. 385/24; 385/33; 385/36
(58) Field of Classification Search .................. 359/811, 359/813, 814, 817; 385/24, 33, 36, 38, 42–47
    See application file for complete search history.

(56) References Cited

U.S. PATENT DOCUMENTS

| | | | |
|---|---|---|---|
| 4,244,045 A | 1/1981 | Nosu et al. | |
| 4,741,588 A | 5/1988 | Nicia et al. | |
| 5,526,338 A | 6/1996 | Hasman et al. | |
| 5,734,156 A | 3/1998 | Dahlin et al. | |
| 5,835,517 A | 11/1998 | Jayaraman et al. | |
| 5,894,535 A * | 4/1999 | Lemoff et al. | ................. 385/47 |
| 5,963,684 A | 10/1999 | Ford et al. | |
| 6,024,453 A | 2/2000 | Edlinger et al. | |
| 6,384,978 B1 | 5/2002 | Singh et al. | |
| 6,404,958 B1 | 6/2002 | Boye et al. | |
| 6,563,976 B1 | 5/2003 | Grann et al. | |
| 6,684,010 B1 | 1/2004 | Morris et al. | |
| 6,941,072 B2 * | 9/2005 | Wu et al. | ...................... 398/83 |

(Continued)

FOREIGN PATENT DOCUMENTS

EP    0 394 865    10/1990

(Continued)

*Primary Examiner*—Timothy J Thompson
(74) *Attorney, Agent, or Firm*—Lee & Morse, P.C.

(57) ABSTRACT

An optical assembly includes a first transparent substrate having first and second surfaces, a second transparent substrate having substantially parallel third and fourth surfaces, a reflective portion on the second transparent substrate, a plurality of filters between the first substrate and the reflective portion, the plurality of filters filtering light beams incident thereon, the plurality of filters and the reflective portion forming a bounce cavity within the second transparent substrate, a collimating lens for collimating light beams to be input to the bounce cavity, a tilt mechanism for introducing tilt to light beams input to the bounce cavity; an input port receiving light beams and an output port transmitting light beams. The tilt mechanism may be between the first and second substrate.

23 Claims, 7 Drawing Sheets

U.S. PATENT DOCUMENTS

| | | |
|---|---|---|
| 7,546,780 B2 * | 6/2009 | Santos .................. 73/866.5 |
| 2006/0078252 A1 | 4/2006 | Panotopoulos |

FOREIGN PATENT DOCUMENTS

| | | |
|---|---|---|
| FR | 2539518 | 7/1984 |
| GB | 2014752 | 8/1979 |
| WO | WO 99/18612 | 4/1999 |
| WO | WO 01/09657 | 2/2001 |
| WO | WO 01/14924 | 3/2001 |

* cited by examiner

OPTICAL ASSEMBLY AND METHOD OF MAKING SAME

CROSS REFERENCE TO RELATED APPLICATION

This is a continuation application based on application Ser. No. 11/295,720, filed Dec. 7, 2005 now U.S. Pat. No. 7,466,502, which is based on provisional application Ser. No. 60/701,505, filed Jul. 22, 2005, the entire contents of which is hereby incorporated by reference.

BACKGROUND OF THE INVENTION

1. Field of the Invention

The present invention is directed to an optical wavelength division coupler, more particularly to an integrated coupler, and a method of making the same.

2. Description of Related Art

Optical multipexers/demultiplexers are generally known in the art. See, for example, commonly assigned U.S. Pat. No. 6,684,010, which is hereby incorporated by reference for all purposes. FIG. 1 is a schematic cross-section of the multiplexer of an embodiment of the '010 patent present invention. An array 104 of light sources 104a-104d, here shown as vertical cavity surface emitting lasers (VCSELs), is provided on a substrate 102. Light output by the light source array 104 is directed to a first optics block 110 having a corresponding plurality of collimating/deflecting elements 112. The light source array 104 is separated from the first optics block 110 by a spacer 106, here shown as etched silicon. The collimated/deflected light then hits a corresponding plurality of filters 122, one for each appropriate wavelength of light. The filters 122 are preferably mounted on or formed on a second optics block 120, but may be provided on a separate, intermediate optics block.

The light passing through the filters 122 is directed to an opposite surface of the optics block 120 having a reflective element 124 thereon. In this particular configuration, the opposite side of the optics block 120 also has a focusing/deflecting element 126 thereon for focusing the light onto a fiber 130, which, as shown in FIG. 1, may be housed in a fiber receptacle 132 or other fiber mount. Alternatively, the fiber could be in a connector located externally to the module in a connector such as an MT-RJ, MTP or LC. The light reflected by the reflective element 124 is directed back toward the input surface of the optics block 120 where it is incident on another filter of the plurality of filters 122. Since each filter will only pass light of a particular wavelength and the light source array 104 has light sources of different wavelengths, all of the filters other than the corresponding filter at the output of the light source will reflect the light back toward the other surface of the optics block 120. Each corresponding filter allows the light from the corresponding light source to pass therethrough to thereby enter the optics block 120.

If this configuration is exploded to view the constituent elements thereof, as shown in FIG. 2, it can be appreciated that there are six (6) parallel surfaces out of which the coupler is constructed, i.e., surfaces 10, 20, 30, 40, 50, 60. When mounting discrete filters 112a-112d, any particle, e.g., dust, between the filter and a surface it is secured to may result in a tilt, changing the location of the output beam on the fiber or the input beam on the detectors. When dealing with filters on the order of 400 microns wide, even a 0.2 micron particle can result in a tilt of greater than 1 arc-min.

SUMMARY OF THE PRESENT INVENTION

The present invention is therefore directed to an integrated coupler that substantially overcomes one or more of the problems due to the limitations and disadvantages of the related art.

It is a feature of an embodiment of the present invention to provide a coupler having reduced filter tilt.

It is another feature of an embodiment of the present invention to provide a method of making a coupler having reduced filter tilt.

It is yet another feature of an embodiment of the present invention to provide means for mounting a filter at reduced tilt.

At least one of the above and other features and advantages of the present invention may be realized by providing an optical assembly including a subassembly having at least two parallel surfaces, a filter adjacent a mount surface of the at least two parallel surfaces, a standoff between the filter and the mount surface, the standoff contacting only a portion of the filter and a securing mechanism between the standoff and the filter.

The standoff may include at least two standoffs. The at least two standoffs may be three standoffs arranged in a triangular pattern. The standoffs may be formed in positions and heights in order to set the tilt of the filter to a predetermined value. The value of the tilt may be less than 5 minutes. The securing mechanism may include an adhesive material in between the mount surface and the filter. The adhesive material may be between the standoff and the filter. The at least two standoffs may have different heights corresponding to a desired angle for the filter. The at least two standoffs may include a standoff in each corner of the filter.

At least one of the above and other features and advantages of the present invention may be realized by providing an optical assembly, including a first transparent substrate having substantially parallel first and second surfaces, a second transparent substrate having substantially parallel third and fourth surfaces, the third and fourth surfaces being substantially parallel with the first and second surfaces, a reflective portion on the second transparent substrate, a plurality of filters between the first substrate and the reflective portion, the plurality of filters filtering light beams incident thereon, the plurality of filters and the reflective portion forming a bounce cavity within the second transparent substrate, a collimating lens for collimating light beams to be input to the bounce cavity, a tilt mechanism for introducing tilt to light beams input to the bounce cavity; an input port receiving light beams and an output port transmitting light beams.

One of the input port and output port is a transparent portion on the fourth surface. A lens may be on one of the third and fourth surfaces. The lens may be a diffractive lens. The tilt mechanism may be between the first surface and the second substrate. The tilt mechanism may include a plurality of lithographs. The plurality of lithographs may be diffractive elements. The optical assembly may include a lens array on one of the first and second surfaces. The optical tilt mechanism may be a plurality of prisms.

The optical assembly may include a third substrate between the first and second substrates, the third substrate having substantially parallel fifth and sixth surfaces, the fifth and sixth surfaces being substantially parallel with the first and second surfaces. The plurality of filters may be on one of the fifth and sixth surfaces. A plurality of electro-optic elements may be on one of the fifth and sixth surfaces.

The optical assembly may include a lens for focusing the light beams output by the bounce cavity. The lens may focus light transmitted by the output port or may collimate light received by the input port.

The light beams may include a plurality of light beams of different wavelengths and the input port may include a plurality of input ports, each port receiving a light beam of the plurality of light beams. The filters may direct the plurality of light beams to the output port.

The light beams includes a plurality of light beams of different wavelengths all incident on the input port and the output port may include a plurality of output ports, each port receiving a light beam of the plurality of light beams. The filters may separate the plurality of light beams into individual light beams incident on the input port.

The tilt mechanism may include a mount for mounting a fiber at an angle with respect to the bounce cavity. The first and second substrates are secured together. The tilt mechanism may be secured to one of the first and second substrates. The tilt mechanism may be formed on one of the first and second substrates. The optical assembly may include a diffractive lens on a surface on which the plurality of filters is secured. An adhesive material may fill the diffractive lens and secure the plurality of filters. The tilt mechanism may be between the input port and the plurality of filters.

The fourth surface may be planar. The second and thirds surfaces may be planar. The input port may be on the first substrate and the output port may be on the second substrate. The input port and the output port may be on the first substrate.

At least one of the above and other features and advantages of the present invention may be realized by providing an optical assembly including a first transparent substrate having first and second surfaces, a second transparent substrate having substantially parallel third and fourth surfaces, a reflective portion on the second transparent substrate, forming a bounce cavity within the second transparent substrate, a plurality of filters between the first substrate and the reflective portion, the plurality of filters filtering light beams incident thereon, the plurality of filters and the reflective portion forming a bounce cavity within the second transparent substrate, an input port for receiving light beams on one of the first and second substrates, an output port for transmitting light beams on one of the first and second substrates, and a tilt mechanism for introducing tilt to the light beams input to the bounce cavity between the first and second substrates.

The input port and the output port may be on the first substrate. The first surface may be substantially parallel to the third and fourth surfaces. The second surface may be substantially parallel to the first, third and fourth surfaces. The tilt mechanism may be a plurality of prisms, a plurality of diffractive elements and/or a sloped surface.

At least one of the above and other features and advantages of the present invention may be realized by providing a method of making an optical subassembly, including providing a first transparent substrate having first and second surfaces, providing a second transparent substrate having substantially parallel third and fourth surfaces, providing a reflective portion on the fourth surface of the second transparent substrate, forming a bounce cavity within the second transparent substrate, providing a plurality of filters between the first substrate and the bounce cavity, and die-bonding at least two of the first substrate, the second substrate and the plurality of filters together.

The method may include die bonding the plurality of filters to the second substrate and then die bonding the second substrate to the plurality of filters. The method may include securing the fourth surface on a die mount and bonding the plurality of filters to the third surface. The method may include, before bonding, providing stand-offs for mounting the plurality of filters on the third surface. The stand-offs may only contact the filters at discrete locations. Providing the stand-offs may include lithographically forming features. The method may further include providing an adhesive material on the third surface, including on the stand-offs. The bonding may include contacting the filters to the adhesive material at room temperature and heating the second substrate.

BRIEF DESCRIPTION OF THE DRAWINGS

The above and other features and advantages of the present invention will become readily apparent to those of skill in the art by describing in detail embodiments thereof with reference to the attached drawings, in which.

DETAILED DESCRIPTION OF THE INVENTION

Figure 2:
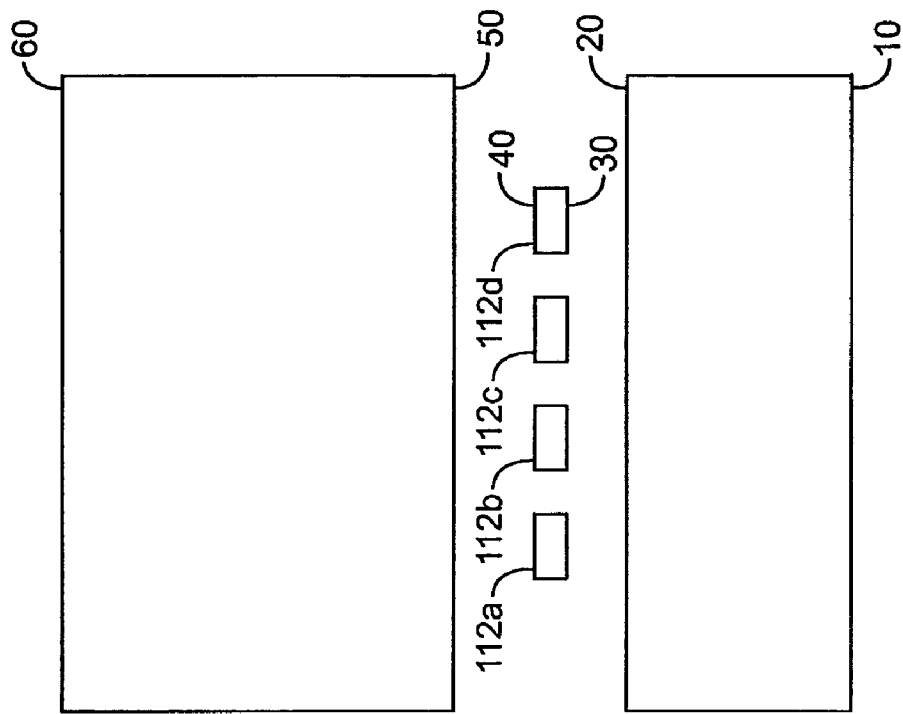
FIG. 2 illustrates a schematic exploded view of the primary components of the multiplexer of FIG. 1.

U.S. Provisional Application No. 60/701,505, filed on Jul. 22, 2005, and entitled: "OPTICAL WAVELENGTH DIVISION COUPLER AND ASSOCIATED METHODS" is hereby incorporated by reference in it entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Generally, as noted above, an optical coupler may include a bounce cavity formed between a reflective surface and the filters, in which light to/from the optoelectronic devices is directed between the filters. As used herein, "bounce cavity" will refer just to the substrate the light beams are traversing between the reflective surface and the filters. Embodiments of the present invention are directed to recognizing that, at least for small scale optical couplers, an angle between the surfaces defining the bounce cavity, i.e., a surface of the filter facing the reflective surface and the reflective surface itself, should be as close to zero as possible. Of course, proper operation of the bounce cavity does require that tilt be introduced to the light beams entering the bounce cavity as well.

In forming an optical coupler in accordance with the present invention, it is often convenient to provide at least three surfaces on which the optical elements, including the reflector and the filters may be provided. One method for forming more than two surfaces on which to provide at least one optical element is set forth, for example, in U.S. Pat. No. 6,096,155, which is hereby incorporated by reference in its entirety for all purposes. As used herein, "wafer level" is to mean any production of multiple optical systems that are subsequently diced for final use, "parallel surface" is to mean a surface that is generally planar and parallel with another, but may have elements projecting therefrom, e.g., refractive lenses, standoffs, alignment features, and "planar surface" is to mean a surface that may have elements thereon, such as a coating or diffractive elements, which do not alter the planarity, a surface that is flat over the majority of the surface, with no significant topology that extends significantly above the flat surface.

Figure 4A:
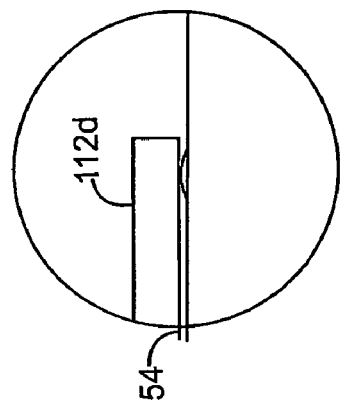
FIG. 4A illustrates a magnified detailed view of a structure on the surface of FIG. 4.
Figure 3:
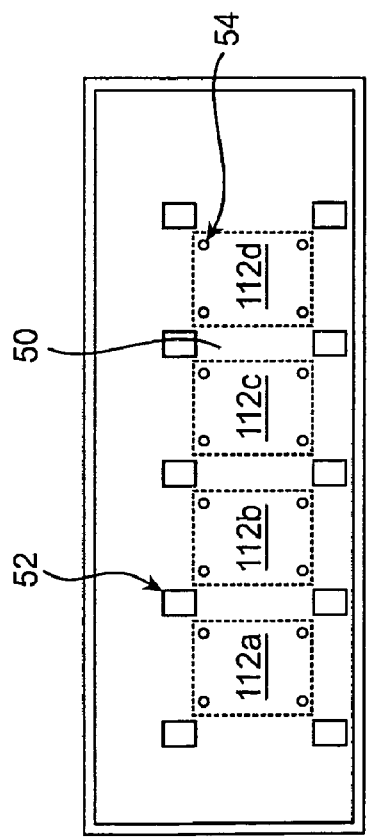
FIG. 3 illustrates a top view of a surface for mounting filters in accordance with an embodiment of the present invention.
Figure 4:
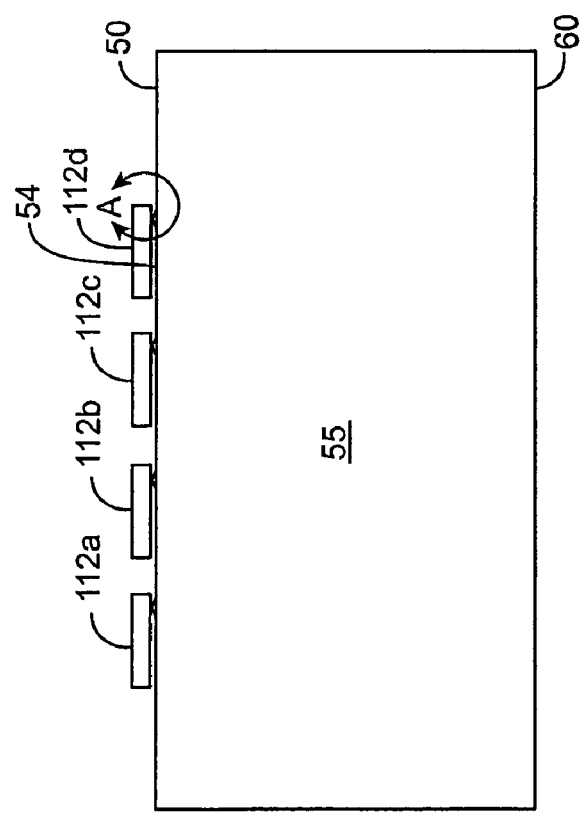
FIG. 4 illustrates a side view of a substrate having the surface of FIG. 3.

A surface on which the filters are to be mounted in accordance with an embodiment of the present invention is shown in FIGS. 3-4A. In the particular example shown therein, this surface is selected to be surface 50 of FIG. 2. The surface 50 may include a plurality of alignment features 52, e.g., metal fiducials, and standoffs 54. In this particular example, the stand-offs 54 are arranged to be at the four corners of the discrete filter, as can be seen in FIG. 3, and each standoff 54 may be a hemispherical shape that has been etched in to the glass, as shown in FIG. 4A. This can be achieved by patterning photoresist, reflowing the resist and subsequently etching the resultant reflowed structure into the substrate. Any other standoff shape or configuration that realizes sufficient securing and minimizing tilt may be used. Advantageously, the standoff may be lithographs, i.e., a lithographically formed feature.

In securing the discrete filters 112a-112d to the surface 50, a bonding material, e.g., epoxy, is provided over the surface 50, and covers the standoffs 54. This bonding material may not be evenly applied and/or may have contaminants therein. However, by applying sufficient pressure, the discrete filter can be made to contact the standoff, or only have a very thin layer of bonding material between the standoffs 54 and the discrete filter. Thus, the discrete filter now is only in contact with the surface 50 a few locations, e.g., three or four points, i.e., at the standoffs 54. The probability of a particle being between the filter and the standoffs, leading to tilt, is significantly reduced as compared with mounting the discrete filter flush with the surface 50. The most critical feature is to insure that the filter is flat, i.e., has no tilt, with respective to a reflective portion 64 of the surface 60. If the filters are small, then the bonding material will cover the space between the bottom surface of the filter substrate in FIG. 4 and surface 50, forming contact with both the filter substrate and substrate 55 and potentially filling nearly the entire area of each filter. Relative heights of the standoffs may also be used to compensate for any tilt in the surface of the substrate to which the filter is to be bonded, any tilt in the reflective surface or any tilt in the filter itself. Once properly mounted relative to the reflective surface 64, the filters may also be secured to another substrate on an opposite side thereof. Standoffs may additionally or alternatively be provided on this other substrate.

Figure 5:
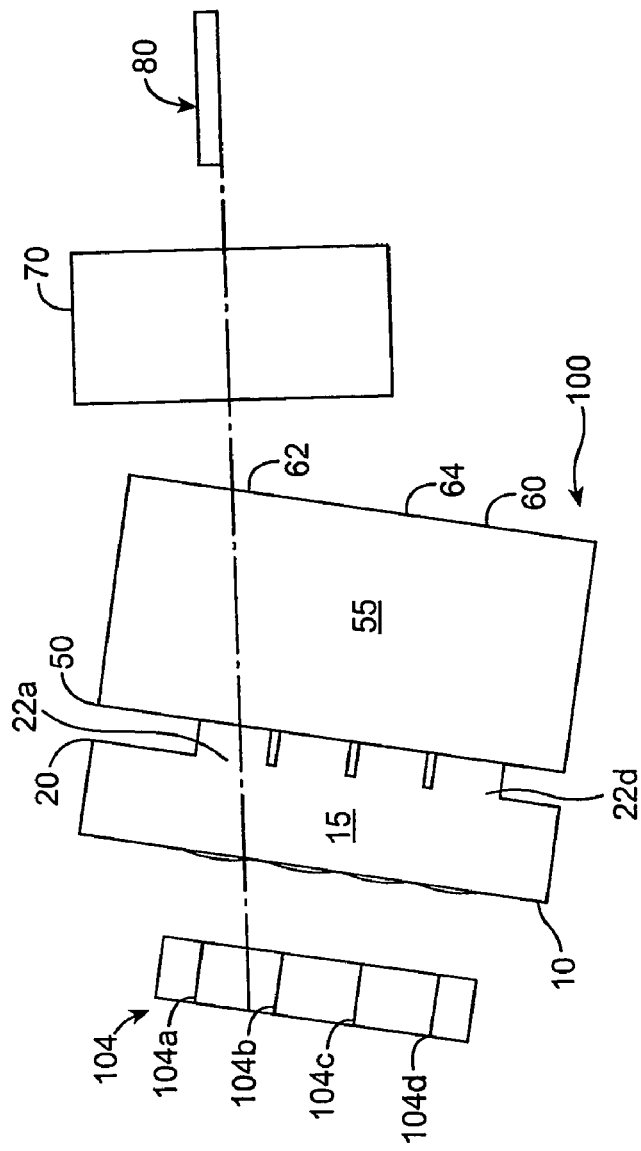
FIG. 5 illustrates a schematic side view of a multiplexer in accordance with an embodiment of the present invention.

FIG. 5 illustrates the other parts of the coupler, here shown as a multiplexer, in relation to the filter mount of FIG. 3-4A. The filters 112a-112d are mounted on the standoffs 54 of the filter mount, and substrates 15 and 55 are secured together to form an optical subassembly 100. An array 104 of light sources 104a-104d is mounted parallel to the optical subassembly. The optical subassembly 100 may include corresponding microlenses 12a-12d, for collimating the light output from the light sources. For proper operation of the multiplexer, i.e., to insure that the light is incident on the bounce cavity at an angle, diffractive elements 22a-22d may be formed on the surface 20. These diffractive elements 22a-22d may also aid in collimating the light. In FIG. 5, each of the lasers 104a-104d are located at the center of each collimating lens 12a-12d. In this manner the collimating lenses need only collimate and not deflect. The diffractive elements are used to provide the deflection. The use of refractive elements (rather than diffractive) for elements 12a-12d improves the total efficiency of the system. Using the refractive elements 112a-12d only to collimate and not to deflect reduces the SAG of the refractive lenses and the pitch required between them, allowing for a more manufacturable and compact multiplexer. In a variation of this embodiment, the refractive lenses 12a-12d may partially deflect as well as collimate the light beams and the diffract elements are used to further deflect the beams. This has the advantage of improved efficiency over the preferred embodiment and, although resulting in slightly larger pitch, would still have a smaller pitch than if the refractive elements were required to provide the full deflection. When diffractive elements are used, the bonding material securing the filters may fill the diffractive elements. Therefore, the diffractive elements may be designed taking into account an index of refraction of the bonding material in order to insure desired performance thereof. Thus, in this embodiment of the present invention, the mechanism for introducing tilt is between or on the substrates 15 and 55.

In another variation on this embodiment, the source array 104 may be tilted with respect to the substrate 15 containing the collimating lens array. In this manner, the tilt to the beams in the bounce cavity can be provided by tilting the source array 104. In this case, if all the tilt comes from tilting of the laser array, then the collimating lenses need to become larger, increasing the SAG of the lenses as well as the required pitch, resulting in an increase in the overall size of the module. However, by tilting the laser array only a small amount and providing the remaining tilt required through the use of the diffractive elements 22a-d, a trade-off between efficiency and size can be reached.

The filters 112a-d may be actually composed of a substrate with a dielectric stack of coatings on one side. These coatings may be place on either side of this substrate. Placing them on the bottom side in FIG. 4A, opposite that shown, puts the filters in direct contact with the standoffs and the bounce cavity and eliminates any wedge or deformation in the substrate itself from affecting the tilt of the beams in the bounce cavity. On the other hand, it may be easier to keep the surface without coatings clean and flat so that if this surface is bonded to surface 50, as shown in FIG. 4A, a higher yield process can be achieved when the system is very sensitive to filter tilt.

Figure 1:
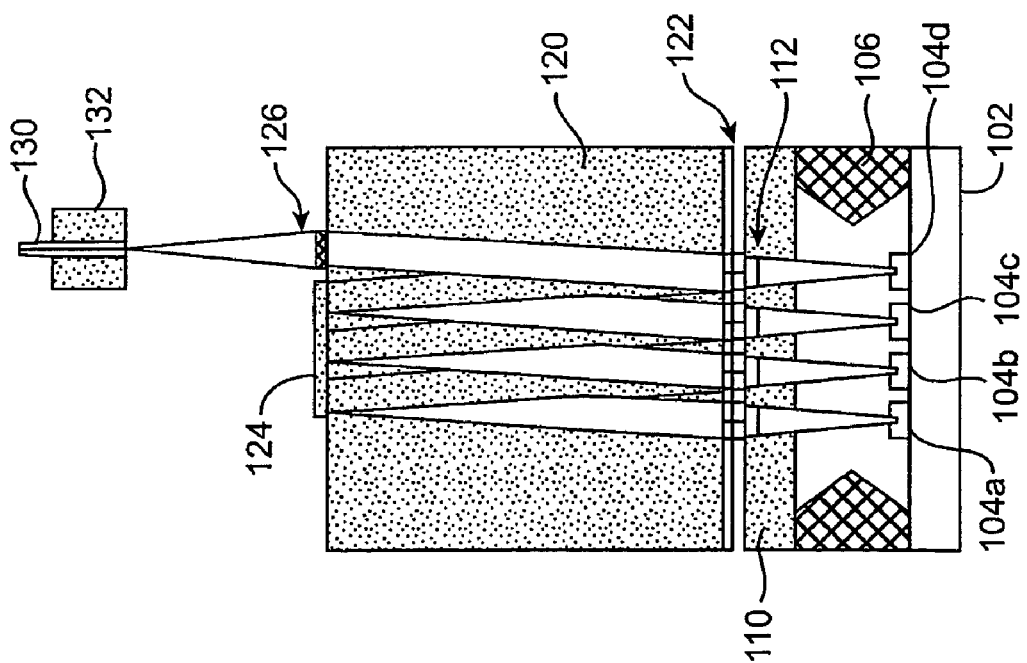
FIG. 1 illustrates a detailed schematic cross-section of a multiplexer of the present invention.

Due to the angle introduced for the operation of the coupler, a fiber 80, receiving the multiplexed signal, may be mounted at an angle to the optical subassembly 100. A window 70 may be provided between the fiber 80 and the optical subassembly 100 for sealing and protecting the active elements from the environment. The optical subassembly 100 may include a multiplex lens 62 on the surface 60 for coupling light into the fiber 80. When the fiber 80 as mounted at a tilt, as shown in FIG. 5, the need for a diffractive element on the surface 60 to straighten out the beam, as shown in FIG. 1, is eliminated. While this improves the efficiency of the system, this tilted fiber configuration may require an off-axis lens, typically an anamorphic and aspheric lens, which may be difficult to make as a refractive element. Therefore, the multiplex lens 62 may be a diffractive element for focusing the light output from the bounce cavity onto the fiber 80, but will still be more efficient than the diffractive element 126 employed in FIG. 1 to couple the multiplexed light into the fiber 130. The tilt line shown in FIG. 5 is merely to illustrate the alignment of the fiber 80 with the other components, and is not indicative of any optical path.

Figure 7:
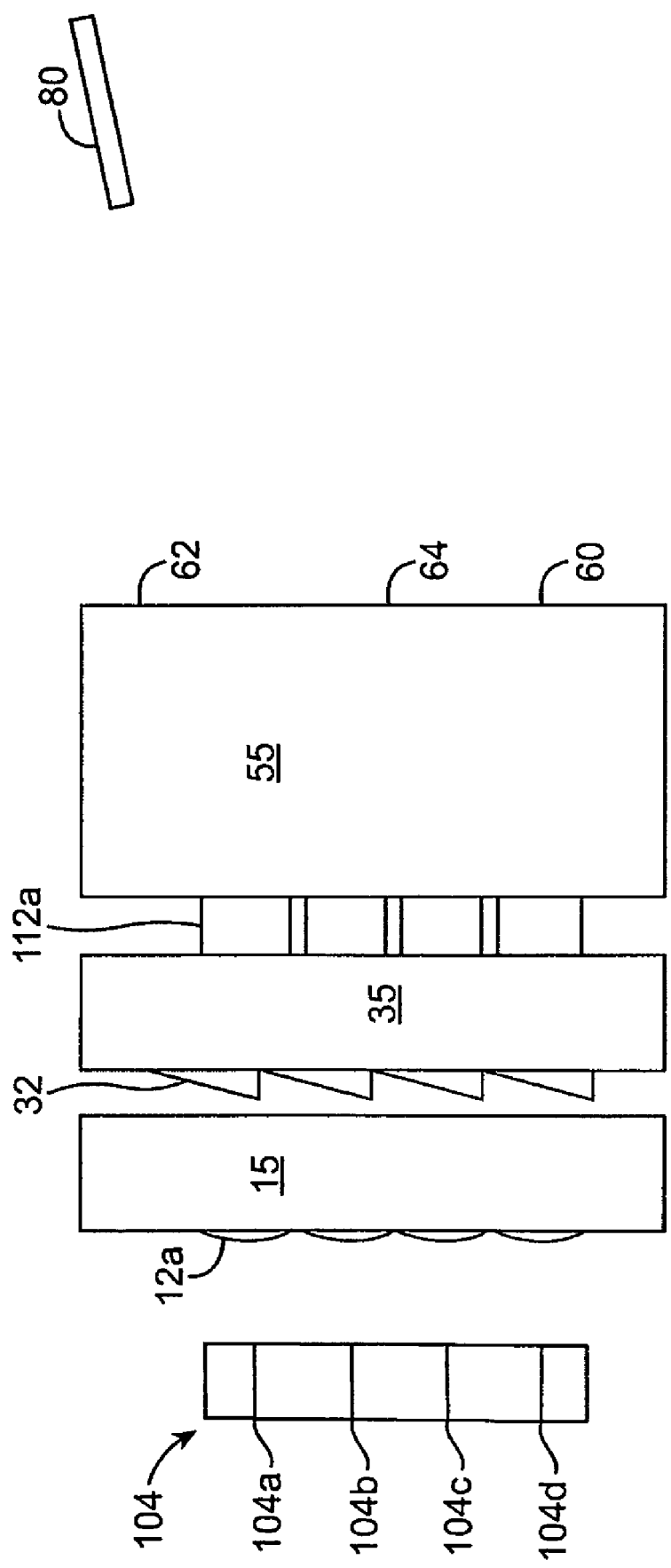
FIG. 7 illustrates a schematic side view of a multiplexer in accordance with another embodiment of the present invention.

Another embodiment of a multiplexer in accordance with the present invention is shown in FIG. 7. As shown in FIG. 7, the multiplexer includes a third substrate 35 between the first and second substrates 15, 55. The third substrate 35 includes a plurality of prism 32a-d for introducing tilt. The prisms 32a-d may replace the diffractive elements 22a-22d. The prisms 32a-32d may be discrete elements secured to the third substrate 35 or may be as single element created, e.g., molded, in the third substrate 35.

Figure 8:
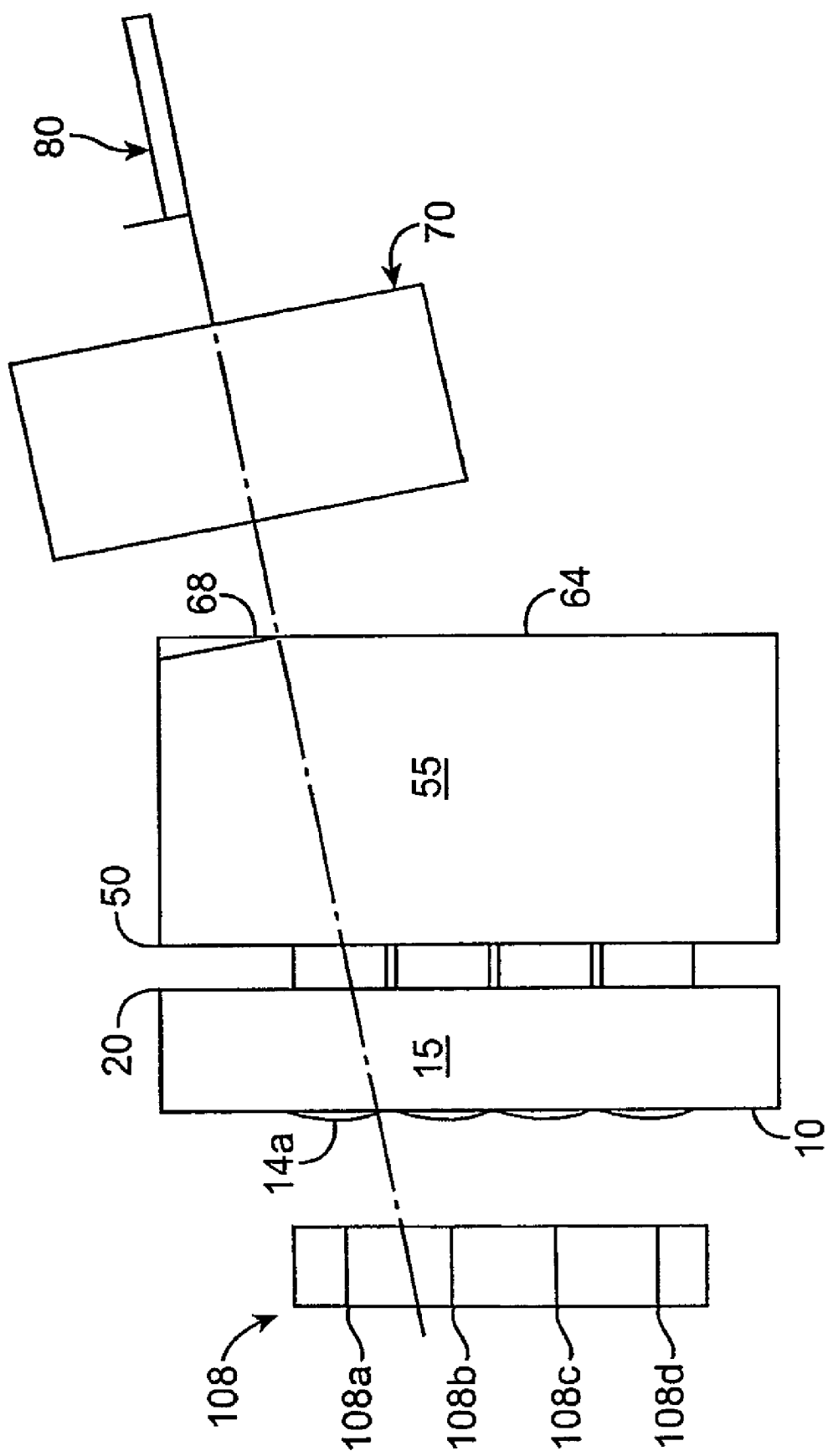
FIG. 8 illustrates a schematic side view of a demultiplexer in accordance with an embodiment of the present invention.

A demultiplexer in accordance with an embodiment of the present invention is shown in FIG. 8. The fiber 80 is still at an angle to the subassembly, for proper reflection within the bounce cavity formed between the filters 112a-112d and the reflective surface 64. The elements are similar to that of the multiplexer shown in FIG. 5, although the diffractive elements 22a-22d are not needed, since detectors 108a-108d can receive the light at large angles. Here, a multiplex diffractive 68 collimates light from the fiber 80 and a lens array 14a-14d focuses light onto the respective detectors 108a-108d.

Note that in all embodiments, all of the surfaces of the substrates 10 and 60 are still parallel with one another. Further, since surface 60 having the reflective surface portion thereon is planar, the order of creating the optical coupler may include the following. Placing the planar surface 60 down, with the surface 50 facing upwards, the filters may be aligned and placed on surface 50 and any pressure applied thereto will be evenly distributed, due to the planar surface 60.

It is a further advantage of the invention that all elements, 15, 55 and 22a-22d may all be attached to each other with a die bonder and using automated or semi-automated visual alignment. Use of a diebonder to place the elements in a stack requires parallel surfaces on the substrates. After the filters are attached to surface 60, the substrate 15 can be placed directly on top of the stack so it contacts the filters 22a-d rather than substrate 55. This requires parallel surfaces on both sides of substrate 15. This step is preferably performed with a bonding material that is transparent to the wavelength of the light emitted by the lasers, e.g. a transparent epoxy. If the filters are small this epoxy will be in the path of the optical beams. In addition, it will fill in the gaps in the diffractive elements on surface 20, when diffractive elements are used. In order for the diffractive elements to be effective in this case, the epoxy can be applied on each filter. Then pressure can be applied to substrate 15 in order to spread the epoxy out in a uniform manner across each filter in such a manner so as to fill in all the grooves in the diffractive elements 22a-22d. Further the diffractives can be formed in a substrate 15 made of a material with a refractive index that has a substantial difference in index of refraction from the bonding material, e.g. a silicon substrate with a typical optical adhesive.

Figure 6:
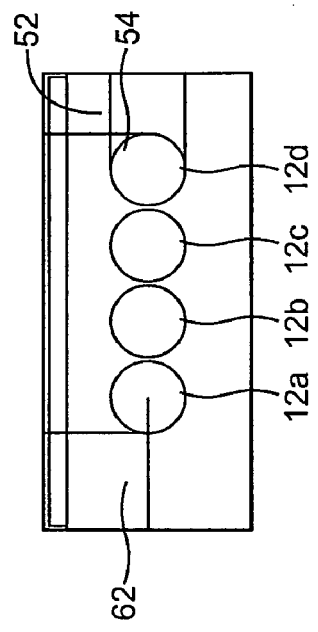
FIG. 6 illustrates a schematic top view of the subassembly of FIG. 5.

When assembling in such a manner, surfaces 10, 20, 50 and 60 are parallel. Thus during each step there is a parallel surface that can be picked up by a vacuum tool and two parallel surfaces that are bonded together. This allows bonding to visual alignment marks that can be placed on these parallel surfaces. It is further desirable that the surfaces be planar or have planar regions that surround the outer portions of each die, or have uniform non-planar regions near the periphery of each die that extend above the topology of the remaining portions of the die. For example, surface 50 is not planar when standoffs are used as in FIG. 3, FIG. 4 and FIG. 4a. However, the stand-offs are the highest regions on surface 50. If these are designed to have uniform height, then the die 112a-d can be placed with a diebonder on to surface 50 with little to no tilt. Another example is surface 10. If refractive elements are used in this case then this surface would be non-planar. However, by using a vacuum tool that attaches to the periphery of the die in FIG. 6 surrounding the microlenses, the die can be picked up and pressure applied evenly during assembly.

When curing the bonding material for securing the discrete filters even on the standoffs, the filters may still move. Also, if applying pressure to insure good contact with the standoffs and accurate alignment, if the filter moves relative to the standoffs, the pressure may no longer be applied normal to the surface thereof. However, by heating a stage, on which a substrate having the filters, standoffs and boding material thereon is mounted, to a temperature at which the bonding material is to be cured, and then applying pressure, precise alignment may be realized.

Figure 9:
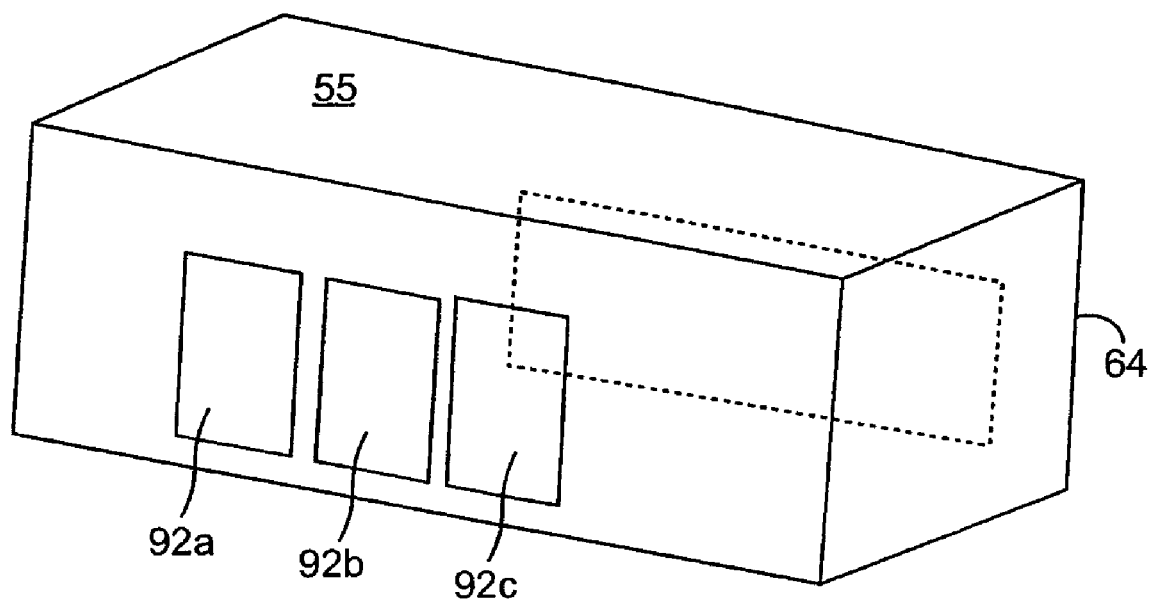
FIG. 9 illustrates a schematic perspective view of an alternative filter configuration of the present invention.

FIG. 9 shows an alternative to the discrete filters of the previous embodiments. Here, filter films 92a-92c may be deposited on the substrate 55, opposite the reflective surface.

Figure 10:
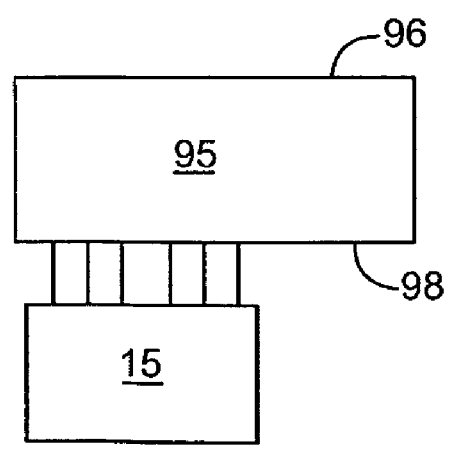
FIG. 10 illustrates a schematic side view of another configuration of the second substrate of the present invention.

FIG. 10 illustrates an alternative structure of the bounce cavity in which a back surface 96 of a second substrate 95 is fully reflective and the input/output port 98 is on the side of the second substrate 95 with the filters adjacent thereto. As shown in FIG. 10, the second substrate may extend beyond the first substrate 15 for access to the port 98, or the first and second substrates may be coextensive, as shown in FIGS. 5, 7 and 8. When the substrates are coextensive, another element may be provided on the first substrate to further control the light beam. Thus, the input/output ports may be on any of the surfaces or may both be on the same surface.

Figure 11:
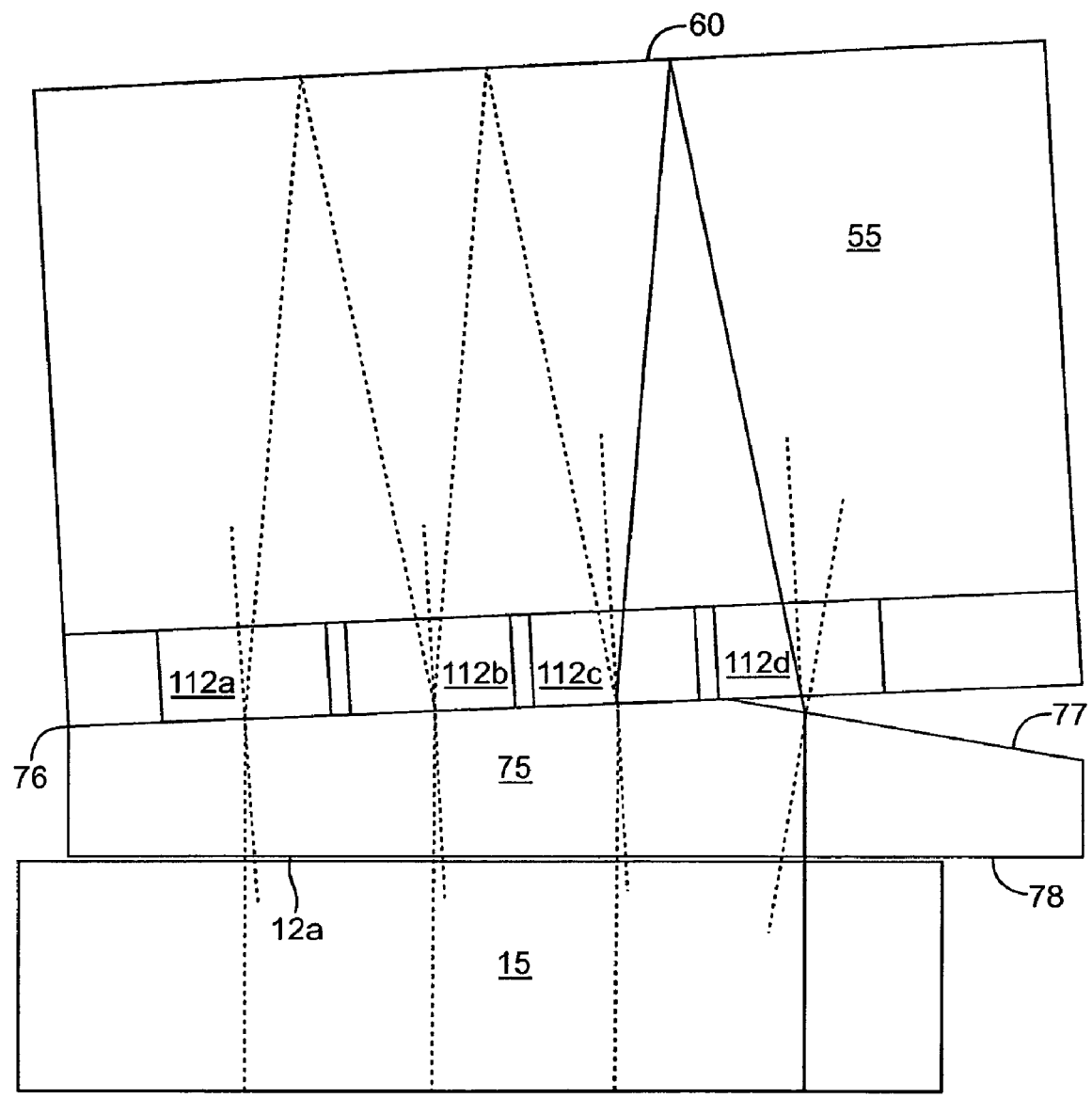
FIG. 11 illustrates a schematic side view of another configuration of the first substrate of the present invention.

FIG. 11 illustrates a schematic side view of another device for introducing tilt to the bounce cavity. In FIG. 11, the mechanism for producing tilt is a wedge substrate 75 between the first and second substrates 55 and 15. A lower surface 78 of the wedge substrate 110 may be substantially planar. An upper surface of the wedge substrate 75 includes a flush angled portion 76 and a steep angled portion 77. The filters 112a-112c may be secured to the flush angled portion 116, which is sufficiently large to provide an adequate bonding surface. In this embodiment, lenses 12a-12d are on the second surface of the first substrate 15, so the optoelectronic elements may be flush with the wedge substrate 110.

In all of the embodiments of the present invention, light is collimated before entering the bounce cavity, and remains collimated throughout, due to the lack of tilt between the surfaces of the bounce cavity. This collimation is of special importance for the light beam traversing the furthest through the bounce cavity. Further, when the light is incident on the bounce cavity at an angle θ, the effective angle is maintained, i.e., n sin θ is constant, within the bounce cavity and throughout any downstream portion of the optical coupler. For example, when the optical coupler is a demultiplexer, the effective angle is maintained to the detectors. For the demultiplexer, this angle θ may be the angle between the fiber and the bounce cavity. For the multiplexer, this angle θ may be introduced by an element between collimating lenses and the bounce cavity. Further, the lens array, for collimation in the multiplexer and focusing for the demultiplexer, is arranged parallel to the bounce cavity.

Embodiments of the present invention have been disclosed herein and, although specific terms are employed, they are used and are to be interpreted in a generic and descriptive sense only and not for purpose of limitation. For example, while a spherical lens has been illustrated as the standoffs, other shapes, using different alignment mechanisms, may be used. Further, while the optoelectronic elements have been illustrated as being adjacent to the optical assembly, the may be remote therefrom and the light associated with these active elements may be delivered to the optical assembly, e.g., using a waveguide. Finally, while the collimating lens is shown as part of the optical subassembly, it could be external thereto. Accordingly, it will be understood by those of ordinary skill in the art that various changes in form and details may be made without departing from the spirit and scope of the present invention as set forth in the following claims.

What is claimed:

1. An optical assembly, comprising:
   a transparent substrate having substantially parallel first and second surfaces;
   a reflective portion on the transparent substrate;
   a plurality of filters filtering light beams incident thereon, the plurality of filters and the reflective portion forming a bounce cavity within the transparent substrate;
   an alignment mechanism accurately aligning the plurality of filters to a predetermined angle relative to the reflective portion, the alignment mechanism including, for each filter of the plurality of filters, a standoff between the filter and a mount surface, the standoff contacting only a portion of the filter; and
   a tilt mechanism for introducing tilt to the light beams input to the bounce cavity.

2. The optical assembly as claimed in claim 1, wherein the stand-offs are the tilt mechanism.

3. The optical assembly as claimed in claim 1, wherein the standoffs include at least two stand-offs formed in positions and heights in order to set the alignment of the filter to a pre-determined value.

4. The optical assembly as claimed in claim 1, further comprising:
   a collimating lens for collimating light beams to be input to the bounce cavity.

5. The optical assembly as claimed in claim 1, wherein the standoffs include a plurality of lithographs.

6. The optical assembly as claimed in claim 1, wherein the tilt mechanism includes a plurality of prisms.

7. The optical assembly as claimed in claim 1, further comprising a diffractive lens on a surface on which the plurality of filters is secured.

8. The optical assembly as claimed in claim 7, further comprising an adhesive material filling the diffractive lens and securing the plurality of filters.

9. The optical assembly as claimed in claim 1, wherein the tilt mechanism includes a plurality of diffractive elements.

10. The optical assembly as claimed in claim 1, wherein the tilt mechanism includes a sloped surface.

11. An optical assembly, comprising:
    a transparent substrate having substantially parallel first and second surfaces;
    a reflective portion on the transparent substrate;
    a plurality of filters filtering light beams incident thereon, the plurality of filters and the reflective portion forming a bounce cavity within the transparent substrate;
    an alignment mechanism accurately aligning the plurality of filters to a predetermined angle relative to the reflective portion;
    a tilt mechanism for introducing tilt to the light beams input to the bounce cavity; and
    a collimating lens for collimating light beams to be input to the bounce cavity.

12. The optical assembly as claimed in claim 1, wherein the predetermined angle is substantially zero.

13. The optical assembly as claimed in claim 1, wherein the predetermined angle is greater than zero.

14. An optical assembly, comprising:
    a transparent substrate having substantially parallel first and second surfaces;
    a reflective portion on the transparent substrate;
    a plurality of filters filtering light beams incident thereon, the plurality of filters and the reflective portion forming a bounce cavity within the transparent substrate;
    a mechanism accurately aligning the plurality of filters to a predetermined angle relative to the reflective portion; and
    a plurality of lithographs introducing tilt to the light beams input to the bounce cavity.

15. The optical assembly as claimed in claim 14, wherein the lithographs are diffractive elements.

16. The optical assembly as claimed in claim 15, wherein the diffractive elements are on a surface on which the plurality of filters is secured.

17. The optical assembly as claimed in claim 16, further comprising an adhesive material filling the diffractive elements and securing the plurality of filters.

18. The optical assembly as claimed in claim 14, further comprising a collimating lens for collimating light beams to be input to the bounce cavity.

19. The optical assembly as claimed in claim 11, wherein the alignment mechanism includes at least one filter of the plurality of filters integrated onto a surface of one of the first and second substrates.

20. The optical assembly as claimed in claim 11, wherein the tilt mechanism includes a plurality of lithographs.

21. The optical assembly as claimed in claim 11, wherein the tilt mechanism includes a plurality of diffractive elements.

22. The optical assembly as claimed in claim 11, wherein the tilt mechanism includes a sloped surface.

23. The optical assembly as claimed in claim 11, wherein the tilt mechanism includes a plurality of prisms.

* * * * *